(12) United States Patent
Son

(10) Patent No.: US 9,569,041 B2
(45) Date of Patent: Feb. 14, 2017

(54) STYLUS PEN, INPUT PROCESSING METHOD USING THE SAME, AND ELECTRONIC DEVICE THEREFOR

(71) Applicant: Samsung Electronics Co., Ltd, Gyeonggi-do (KR)

(72) Inventor: Je-Hyun Son, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 14/026,999

(22) Filed: Sep. 13, 2013

(65) Prior Publication Data

US 2014/0078105 A1 Mar. 20, 2014

(30) Foreign Application Priority Data

Sep. 14, 2012 (KR) .................... 10-2012-0102343

(51) Int. Cl.
*G06F 3/044* (2006.01)
*G06F 1/16* (2006.01)
*G06F 3/041* (2006.01)
*G06F 3/0354* (2013.01)
*G06F 3/046* (2006.01)

(52) U.S. Cl.
CPC ............... *G06F 3/044* (2013.01); *G06F 1/16* (2013.01); *G06F 3/03545* (2013.01); *G06F 3/046* (2013.01); *G06F 3/0418* (2013.01); *G06F 2203/04106* (2013.01)

(58) Field of Classification Search
CPC ............ G06F 3/044; G06F 1/16; G06F 3/041; G06F 3/046
See application file for complete search history.

(56) References Cited

U.S. PATENT DOCUMENTS 4,878,553 A * 11/1989 Yamanami et al. ........ 178/18.07
5,491,706 A * 2/1996 Tagawa et al. ............... 714/812
(Continued)

FOREIGN PATENT DOCUMENTS

KR 10-2006-009122 1/2006
KR 10-2008-0113127 12/2008
(Continued)

OTHER PUBLICATIONS

Partial European Search Report dated Feb. 13, 2014 in connection with European Application No. 13184359.1, 7 pages.
(Continued)

*Primary Examiner* — Nitin Patel
*Assistant Examiner* — Afroza Chowdhury

(57) ABSTRACT

An electronic device includes a digitizer pad, a touch panel which is disposed above the digitizer pad, a digitizer pad controller configured to detect a first position using electromagnetic induction from the digitizer pad, a touch panel controller configured to detect a second position about a capacitance change from the touch panel, and a host device configured to correct the first position with reference to the second position and specifying the corrected first position as a touch position. A method includes detecting a first position using electromagnetic induction from a digitizer pad, detecting a second position using a capacitance change from a touch panel, correcting the first position with reference to the second position, and specifying the corrected first position as a touch position.

12 Claims, 12 Drawing Sheets

(56) References Cited

U.S. PATENT DOCUMENTS

| | | | |
|---|---|---|---|
| 7,084,933 B2* | 8/2006 | Oh et al. | 349/12 |
| 8,599,143 B1* | 12/2013 | Rymarz | 345/173 |
| 8,686,969 B2* | 4/2014 | Chen | G06F 3/044 |
| | | | 178/18.01 |
| 2006/0279548 A1* | 12/2006 | Geaghan | 345/173 |
| 2008/0142280 A1* | 6/2008 | Yamamoto et al. | 178/18.02 |
| 2010/0181121 A1 | 7/2010 | Tremblay | |
| 2012/0037433 A1 | 2/2012 | Yeh et al. | |
| 2012/0327042 A1* | 12/2012 | Harley et al. | 345/179 |
| 2013/0009907 A1* | 1/2013 | Rosenberg et al. | 345/174 |
| 2013/0271487 A1* | 10/2013 | Lincoln | 345/619 |
| 2014/0204038 A1* | 7/2014 | Ohba | G06F 3/03545 |
| | | | 345/173 |

FOREIGN PATENT DOCUMENTS

| | | |
|---|---|---|
| KR | 10-2009-0001164 | 1/2009 |
| WO | WO00/33244 | 6/2000 |
| WO | WO 00/33244 | 6/2000 |

OTHER PUBLICATIONS

Extended EP Search Report in connection with Patent Application No. 13184359.1, dated May 22, 2014, 7 pages.
Chinese Office Action and English translation issued for CN 201310421308.9 dated Jan. 21, 2016, 11 pgs.

* cited by examiner

STYLUS PEN, INPUT PROCESSING METHOD USING THE SAME, AND ELECTRONIC DEVICE THEREFOR

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Sep. 14, 2012 and assigned Serial No. 10-2012-0102343, the entire disclosure of which is hereby incorporated by reference.

TECHNICAL FIELD

The disclosure relates to a stylus pen, a method of processing input using the stylus pen, and an electronic device thereof.

BACKGROUND

Recently, as portable electronic devices have come into wide use, they have become necessities of modern life. These portable electronic devices have been developed into multimedia communication devices capable of providing not only an original voice communication service but also various data transmission services and various additional services. Services capable of being provided from the portable electronic device have increased and User Interface (UI) technologies for controlling the portable electronic devices have also been developed continuously.

Recently, as the size of the displays of the portable electronic devices has been competitively increased and resolution thereof has been also enhanced competitively, needs of users for cursive character input, an image memo, etc. have also increased. For example, applications for marking a destination on a map or writing and transmitting a message on a photo have become marketing points. Also, it is necessary to perform cursive character input in a country using Chinese characters like Japan or China. Therefore, with a pen, it is possible to perform an image memo or cursive character input. Accuracy of the image memo or cursive character input can be enhanced.

FIG. 1 illustrates a configuration of an input system using a stylus pen. Referring to FIG. 1, the input system using the stylus pen uses an ElectroMagnetic Resonance (EMR) scheme or an electromagnetic induction scheme and includes a stylus pen 20 and a touch screen device 30. The stylus pen 20 has a tip 21 and includes a resonance circuit therein.

The touch screen device 30 includes a digitizer pad 35, a display panel 34, a window 31, and a digitizer pad controller 36. The digitizer pad 35, the display panel 34, and the window 31 are laminated in order.

The digitizer pad controller 36 supplies alternating current (AC) to the digitizer pad 35. The digitizer pad 35 generates an electromagnetic field. If the stylus pen 20 approaches the electromagnetic field of the digitizer pad 35, an electromagnetic induction phenomenon is generated and the resonance circuit 22 of the stylus pen 20 generates current.

The resonance circuit 22 of the stylus pen 20 forms a magnetic field 23 using the generated current. The digitizer pad controller 36 scans strength of the magnetic field 23 supplied from the stylus pen 20 to the digitizer pad 35 throughout the entire region of the digitizer pad 35 and detects a position. The digitizer pad controller 36 provides the detected position to a host device. The host device performs an operation based on the detected position. For example, the host device can output image information on the display panel 34.

In general, the stylus pen 20 has a resonance circuit 22 which is spaced apart from the tip 21 structurally. When a user holds the stylus pen 20 in his or her hand and touches it on the touch screen device 30, it is slanted. Accordingly, when the stylus pen 20 is slanted, a portion of the stylus pen 20 with a relatively great magnetic field leans toward the touch screen device. Therefore, when the stylus pen 20 is slanted, the digitizer pad controller 36 incorrectly recognizes the position of the tip 21.

FIG. 2 illustrates a touch screen operation using a stylus pen. Referring now to FIGS. 1 and 2, for example, when the user draws a line with the stylus pen 20, the stylus pen 20 which is held in his or her hand is slanted. As described above, the digitizer pad controller 36 incorrectly recognizes the position 42 instead of the position 41 where the tip 21 touches. Because the host device displays a line on the position 42 which is separated from the tip 21 of the stylus pen 20, the user does not have a feeling that he or she uses the stylus pen 20 properly.

SUMMARY

To address the above-discussed deficiencies, it is a primary object of the disclosure to provide at least the advantages described below. Accordingly, an embodiment of the disclosure allows touch recognition in a stylus pen through a digitizer pad by having a resonance circuit. Touch recognition through a capacitive touch panel is enhanced by installing an electrostatic rubber on a rim of a tip.

In disclosed embodiments, an input processing method and an electronic device for implementing the method senses that a stylus pen touching a touch screen device is slanted.

In disclosed embodiments, an input processing method and an electronic device for implementing the method corrects a touch position of a stylus pen in an electronic device which uses an electromagnetic induction stylus pen.

In disclosed embodiments, an input processing method and an electronic device for implementing the method detects a first position recognized through a digitizer pad due to the touch of a stylus pen and a second position recognized through a capacitive touch panel and correcting the first position with reference to the second position.

In disclosed embodiments, an input processing method includes detecting a first position using electromagnetic induction from a digitizer pad, detecting a second position using a capacitance change from a touch panel, correcting the first position with reference to the second position, and specifying the corrected first position as a touch position.

In disclosed embodiments, an electronic device includes a digitizer pad, a touch panel which is disposed above the digitizer pad, a digitizer pad controller configured to detecting a first position using electromagnetic induction from the digitizer pad, a touch panel controller configured to detecting a second position using a capacitance change from the touch panel, and a host device configured to correct the first position with reference to the second position and specify the corrected first position as a touch position.

In disclosed embodiments, an electronic device includes a digitizer pad, a touch panel which is disposed above the digitizer pad, a digitizer pad controller configured to detect a first position using electromagnetic induction from the digitizer pad, a touch panel controller configured to detect a second position using a capacitance change from the touch panel, one or more processors, a memory, and one or more modules stored in the memory and configured to be executable by each of the one or more processors, wherein each of the one or more modules corrects the first position with reference to the second position and specifies the corrected first position as a touch position.

In disclosed embodiments, a stylus pen includes a housing having a rod shape with a first end and a second end, the first end having a narrowed profile and defining an opening into a receiving space. A tip is installed in the opening in first end of the housing and protruding to the outside of the housing, the tip configured to be moved in a certain range along a longitudinal direction of the housing, and the tip further configured to perform self-centering with respect to the housing. An electrostatic body is installed on a narrowed portion of the housing and spaced apart from the tip. A push button can be installed on a side of the housing. A resonance circuit can be disposed in the housing configured to change capacitance when the tip is moved towards receiving space of the housing or when the button is pushed, wherein the tip and the electrostatic body are configured to simultaneously touch on a plane when the housing is slanted at a predetermined angle.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 3 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged stylus pen and touch screen system. Exemplary embodiments of the disclosure will be described herein below with reference to the accompanying drawings. In the following description, well-known functions or constructions are not described in detail since they would obscure the disclosure in unnecessary detail.

Figure 1:
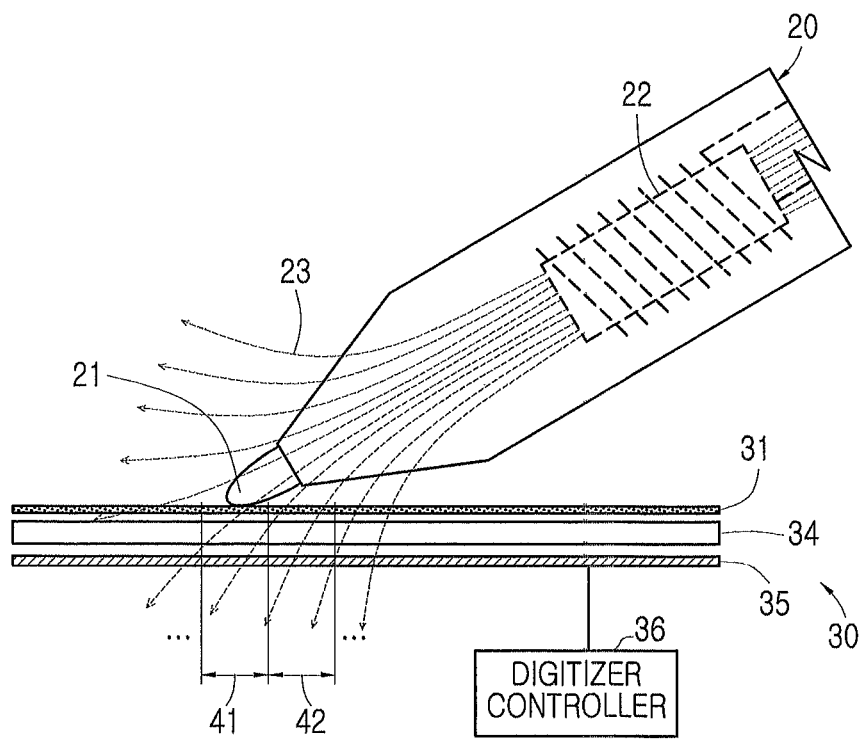
FIG. 1 illustrates configuration of an input system using a stylus pen.
Figure 2:
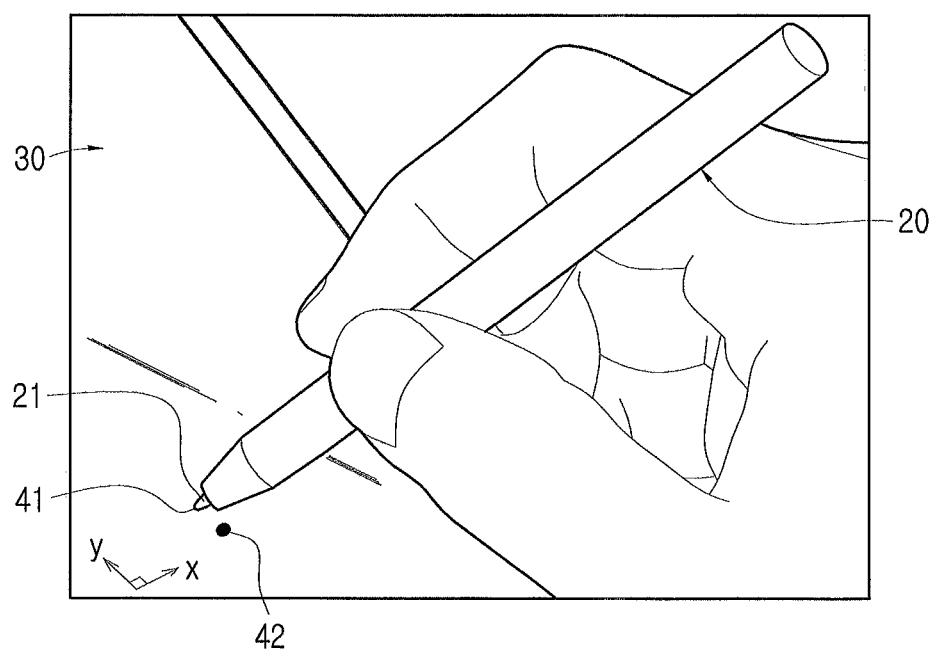
FIG. 2 illustrates a touch screen operation using a stylus pen.
Figure 3:
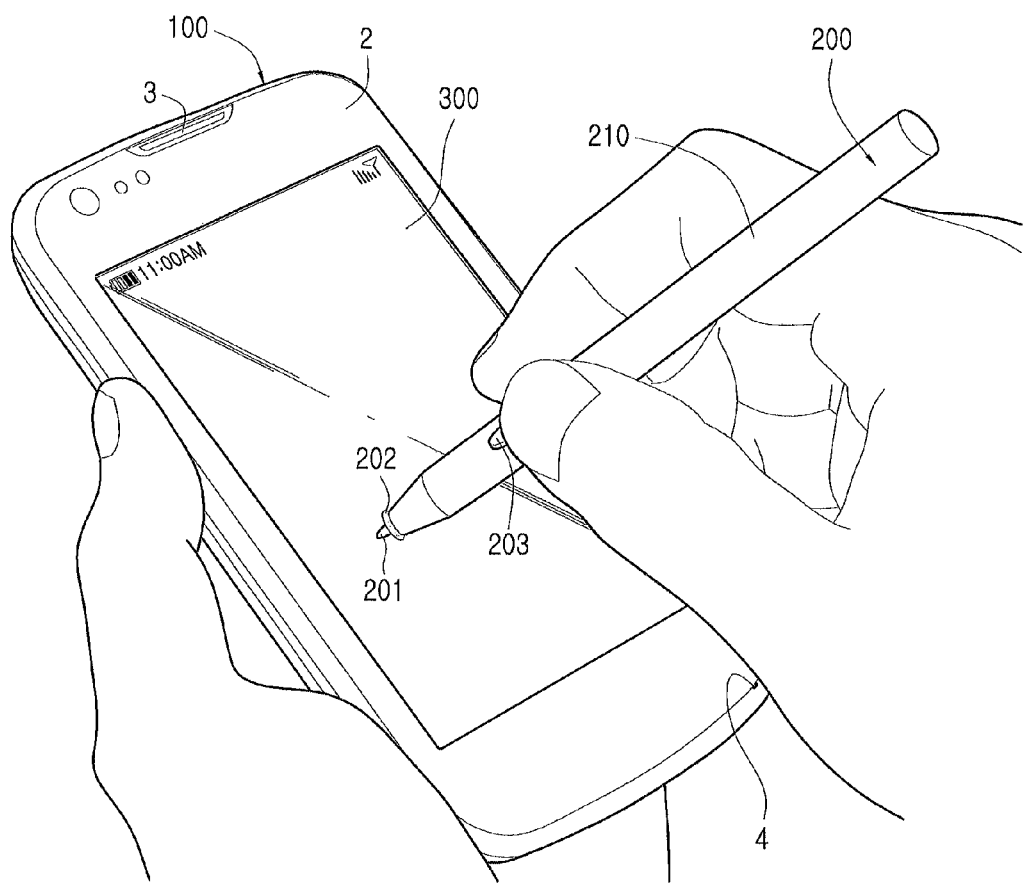
FIG. 3 illustrates a stylus pen and an electronic device using the same according to one embodiment of the disclosure.

FIG. 3 illustrates a stylus pen and an electronic device using the same according to one embodiment of the disclosure.

Referring to FIG. 3, a touch screen device 300 is installed on a front surface 2 of the electronic device denoted by 100. This touch screen device 300 can support input and output functions of data simultaneously and sense a touch.

The touch screen device 300 has a structure in which a window, a capacitive touch panel, a display panel, and a digitizer pad are successively laminated. The window is made of transparent materials. The window is attached to the capacitive touch panel or is fixed to a housing which forms the appearance of the electronic device 100. For example, the window can be attached to the capacitive touch panel using an adhesive. This adhesive can be any one of a Super View Resin (SVR), an Optically Clear Adhesive (OCA), etc.

The capacitive touch panel causes a capacitance change due to a touch or approach of an electrostatic body (e.g., fingers). The touch screen device 300 detects a touch position from the capacitance change. The display panel outputs an image. The digitizer pad receives a magnetic field from a stylus pen 200 by a touch or approach of the stylus pen 200. The touch screen device 300 detects a touch position from the received magnetic fields.

A speaker 3 converts an electric signal into an audible frequency band and outputs the converted signal. A microphone 4 which converts sound waves transmitted from people or sound sources into electric signals is installed in the touch screen device 300.

The stylus pen 200 includes a resonance circuit according to an electromagnetic induction scheme. If the stylus pen 200 approaches an electromagnetic field generated from the digitizer pad, the resonance circuit of the digitizer pen 200 generates current and forms a magnetic field with the generated current.

Also, the stylus pen 200 can have a pen type shape or rod shape having a tip 201. The stylus pen 200 has an electrostatic body (e.g., an electrostatic rubber) 202 on a rim of the tip 201. When the stylus pen 200 is touched on the window in a predetermined slanted orientation, or in a range of slanted positions, the electrostatic body 202 touches the window. Accordingly, capacitance of a corresponding position of the capacitive touch panel is changed.

In addition, in some embodiments, the stylus pen 200 can have a button 203. When the button 203 is pushed, an additional capacitor is connected in parallel. Accordingly, the stylus pen 200 forms an electric field of a resonance frequency corresponding to a function of the electronic device 100.

Figure 4:
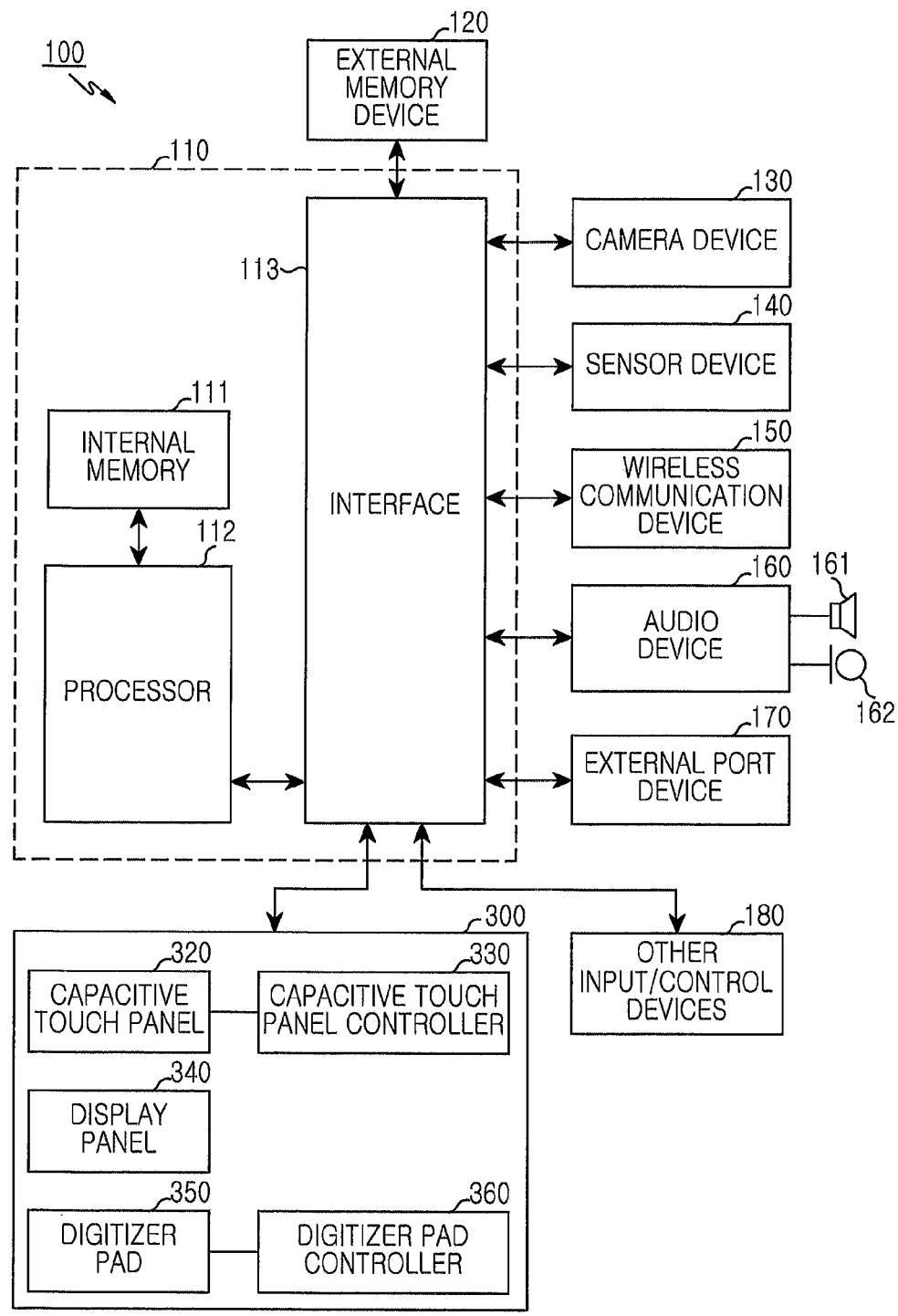
FIG. 4 is a block diagram illustrating configuration of an electronic device according to one embodiment of the disclosure.

FIG. 4 is a block diagram illustrating configuration of an electronic device according to one embodiment of the disclosure.

This electronic device denoted by 100 can be any suitable touch-screen apparatus, which in different embodiments may be a mobile phone, a mobile pad, a media player, a tablet computer, a handheld computer, and a Personal Digital Assistant (PDA), for example. Also, the electronic device 100 can be a convergence electronic device, including devices in which two or more functions are combined among these apparatuses.

The electronic device 100 includes a host device 110, an external memory device 120, a camera device 130, a sensor device 140, a wireless communication device 150, an audio device 160, an external port device 170, a touch screen device 300, and other input/control devices 180. Herein, the external memory device 120 and the external port device 170 can be a plurality of external memory devices and external port devices, respectively.

The host device 100 includes an internal memory 111, one or more processors 112, and an interface 113. The internal memory 111, the one or more processors 112, and the interface 113 can be separately configured or can be configured in one or more Integrated Circuits (ICs).

The processor 112 can execute several software programs and perform several functions for the electronic device 100. The processor 112 can perform process and control for audio communication, video communication, and data communication. Also, in addition to these general functions, the processor 112 can execute a software module (instruction set) stored in the internal memory 111 and/or the external memory device 120 and can perform several functions corresponding to the software module. Also, in addition to these general functions, the processor 112 can play a role in executing a specific software module (instruction set) stored in the internal memory 111 and/or the external memory device 120 and performing several specific functions corresponding to the specific software module. That is, the processor 112 can interwork with software modules stored in the internal memory 111 and/or the external memory device 120 and perform embodiments of the disclosure. Also, the processor 112 can include one or more data processors, an image processor, or a codec. In addition, the electronic device 100 can also include a data processor, an image processor, or a codec separately.

The interface 113 can connect several devices of the electronic device 100 with the host device 110.

The camera device 130 can perform camera functions such as photo and video recording. The camera device 130 can include a Charge Coupled Device (CCD) or a Complementary Metal-Oxide Semiconductor (CMOS) device, etc. Also, the camera device 130 can adjust hardware configurations, for example, lens movement, an F number of a diaphragm, etc. according to a camera module executed by the processor 112.

A variety of components of the electronic device 100 can be coupled by one or more communication buses or stream lines.

The sensor device 140 can include a motion sensor, an optical sensor, a temperature sensor, etc. and perform several functions. For example, the motion sensor can sense motion of the electronic device 100. The optical sensor can sense light around the electronic device 100.

The wireless communication system 150 can perform wireless communication and can include a Radio Frequency (RF) transceiver and an optical (e.g., infrared) transceiver. The wireless communication device 150 can be designed to operate through one of communication networks, such as a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax Network, or/and a Bluetooth network.

The audio device 160 connects to a speaker 161 and a microphone 162 and is responsible for inputting and outputting audio, such as a voice recognition function, a voice copy function, a digital recording function, and a phone call function. That is, the audio device 160 communicates with a user through the speaker 161 and the microphone 162. Also, the audio device 160 can receive a data signal from the host device 110, convert the received data signal into an electric signal, and output the converted electric signal through the speaker 161. The speaker 161 converts the electric signal into an audible frequency band and outputs the converted signal. The microphone 162 converts sound waves transmitted from people or other sound sources into electric signals. Also, the audio device 160 receives the electric signal from the microphone 162, converts the received electric signal into an audio data signal, and transmits the converted audio data signal to the host device 110. The audio device 160 can include an earphone, headphone, or headset capable of being attached and detached to the electronic device 100.

The external port device 170 connects the electronic device 100 to another external electronic directly or connects it to another electronic device indirectly through a network (e.g., Internet, intranet, a wireless Local Area Network (LAN), etc.).

The touch screen device 300 provides an input/output interface between the electronic device 100 and the user. The touch screen device 300 transmits touch input of the user to the host device 100 and shows visual information, for example, text, graphics, video, etc., provided from the host device 110 to the user by applying touch sensing technologies.

The touch screen device 300 includes a capacitive touch panel 320, a capacitive touch panel controller 330, a display panel 340, a digitizer pad 350, and a digitizer pad controller 360.

In the capacitive touch panel 320, electrode lines including a plurality of electrodes are alternately and horizontally formed. The capacitive touch panel 320 receives voltage from the capacitive touch panel controller 330 and forms an electric field for touch sensing. The capacitive touch panel controller 330 detects a touch position according to a capacitance change from the capacitive touch panel 320. The capacitive touch panel controller 330 provides the detected position to the host device 110. The host device 110 performs an operation according to the detected position.

The display panel 340 outputs visual information, for example, text, graphics, video, etc. under control of the host device 110.

In the digitizer pad 350, lines are alternately and horizontally formed in X and Y axis directions. The digitizer pad 350 supplies AC to the digitizer pad controller 360 and generates an electric field. When a stylus pen approaches the digitizer pad 350, a resonance circuit of the stylus pen generates current and forms a magnetic field by the generated current. The digitizer pad controller 360 scans strength of the magnetic field provided from the stylus pen to the digitizer pad 350 throughout the entire region of the digitizer pad 350 and detects a position. The digitizer pad controller 360 provides the detected position to the host device 110. The host device 110 performs an operation based on the detected position.

The other input/control devices 180 can include an up/down button for controlling volume. In addition, the other input/control devices 180 can include at least one of pointer devices, such as a push button, a locker button, a locker switch, a thumb-wheel, a dial, a stick, and a stylus, which have a corresponding function.

The external memory device 120 includes a high-speed Random Access Memory (RAM) such as one or more magnetic storages, a non-volatile memory, one or more optical storages, and/or a flash memory (e.g., a NAND flash memory or a NOR flash memory).

The external memory device 120 stores software components. The software components can include an Operating System (OS) module, a communication module, a graphic module, a UI module, a codec module, one or more application modules and a digitizer correction module. Also, the term "modules" can be expressed in a set of instructions, an instruction set, or programs.

The OS module can include an embedded OS such as Windows, Linux, Darwin, RTXC, UNIX, OS X, or VxWorks and can include several software components for controlling a general system operation. Control of this general system operation includes memory management and control, storage hardware (device) control and management, power control and management, etc. In addition, the OS module can also perform a function for smoothly communicating between several hardware components (devices) and software components (modules).

The communication module can communicate with counterpart electronic devices such as a computer, a server, and an electronic device through the wireless communication device 150 or the external port device 170.

The graphic module can include several software components for providing and displaying graphics on the touch screen device 180. The term "graphics" means text, web pages, icons, digital images, video, animations, etc.

The UI module can include several software components related to a UI. In addition, the UI module includes contents about whether a state of a UI is changed to any state, whether a state of a UI is changed in any condition, etc.

The codec module can include software components related to encoding and decoding of video files.

The camera module can include camera1-related software components capable of performing camera-related processes and functions.

The application module can include a browser function, an email function, an instant message function, a word processing function, a keyboard emulation function, an address book function, a touch list function, a widget function, a Digital Right Management (DRM) function, a voice recognition function, a voice copy function, a position determining function, a location based service function, etc. The external memory device 120 can further include additional modules (instructions) in addition to the above-described modules.

When the stylus pen is touched on the touch screen 300 in a slanted orientation, the digitizer correction module corrects the position recognized by the digitizer pad controller 360.

In general, the stylus pen has the resonance circuit which is spaced apart from the tip structurally. When the user holds and uses the stylus pen in his or her hand, the stylus pen can be slanted. Accordingly, when the stylus pen is slanted, a position where a relatively great magnetic field from the stylus pen 20 is supplied leans toward the slanted side. Therefore, when the stylus pen is slanted, a position where the digitizer pad controller 360 recognizes the touch of the tip is not an actual position where the tip is touched but a position which is offset from the position where the tip is touched. Particularly, an electrostatic rubber can be installed on a rim of a tip of the stylus pen according to one embodiment of the disclosure. When the stylus pen is touched on the touch screen device 300, the capacitive touch panel controller 330 also senses a touch using a capacitance change from the capacitive touch panel 320 by the electrostatic rubber.

The digitizer correction module detects a first position using a magnetic field signal from the digitizer pad 350, detects a second position using a capacitance change from the capacitive touch panel 320, corrects the first position with reference to the second position, and specifies the corrected first position. Because the first position and the second position can be detected by the stylus pen, a process of correcting the first position with reference to the second position is followed when the second position is included in a range determined from the first position. Also, when correcting the first position with reference to the second position, the digitizer correction module determines a direction of the second position to the first position and moves the first position in an opposite direction of the determined direction.

A variety of functions of the electronic device 100 can be executed by one or more streaming processing, hardware including an Application Specific Integrated Circuit (ASIC), software, and/or combination of them.

Figure 5:
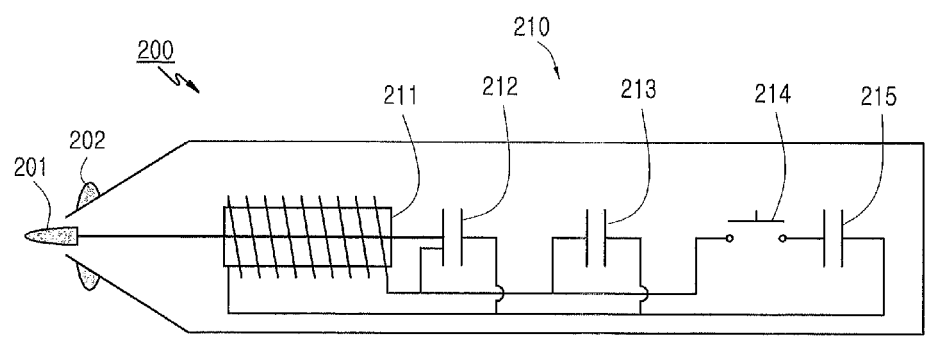
FIG. 5 illustrates configuration of a stylus pen according to one embodiment of the disclosure.

FIG. 5 illustrates configuration of a stylus pen according to one embodiment of the disclosure.

Referring to FIGS. 4 and 5, the stylus pen 200 has a pen type shape, a tip 201 and an electrostatic body (e.g., an electrostatic rubber) 202 on a rim of the tip 201. The stylus pen 200 includes a resonance circuit 210 therein.

The stylus pen 200 includes a housing. The housing has a rod type shape. One end of the stylus pen 200 is relatively narrowed, or in other words, is narrowed. The housing has a receiving space. Also, the stylus pen 200 includes a tip 201. The tip 201 is installed in the opening on one end of the housing, and protrudes to the outside. The tip 201 can move in a certain range in a longitudinal direction of the housing and perform self-centering. Self-centering means an operation in which the tip 201 returns to an original position automatically. In addition, the stylus pen 200 includes the electrostatic body 202. The electrostatic body 202 is spaced apart from the tip 201 and installed in a predetermined place of the housing corresponding to the rim of the tip 201, as shown. The electrostatic body 202 can be elastically restored. Also, in some embodiments, the stylus pen 200 includes a button. The button can be installed at a side of the housing. The button can be pushed.

The housing includes the resonance circuit 210 therein. When the tip 201 is moved pressed towards the inside of the housing or when the button is pushed, the resonance circuit 210 changes capacitance.

Also, when the user slants the housing at a certain angle and touches it on a plane, for example, a touch screen, the tip 201 and the electrostatic body 202 touch the touch screen device 300.

The resonance circuit 210 includes an inductor 211 and a plurality of capacitors 212, 213, and 215 which are connected in parallel. If the resonance circuit 210 approaches the digitizer pad 350 of the touch screen device 300, an electromagnetic induction phenomenon is generated. Accordingly, the resonance circuit 210 generates current. Also, the resonance circuit 210 forms a magnetic field using the generated current.

The inductor 211 has a coil for an electromagnetic resonance (induction) operation.

When the tip 201 of the stylus pen 200 is pushed, it has a structure where it is moved to the inside of the housing by a certain distance. The resonance circuit 210 includes the variable capacitor 213. The variable capacitor 213 changes its capacitance according to a degree in which the tip 201 is pressed. The resonance circuit 210 forms a magnetic field of a variable resonance frequency corresponding to a corresponding function of the electronic device 100.

Also, the stylus pen 200 can have a button. When the button is pushed, the capacitor 215 is connected to the inductor 211 in parallel. The resonance circuit 210 forms a magnetic field of a resonance frequency corresponding to a function of the electronic device 100.

Figure 6:
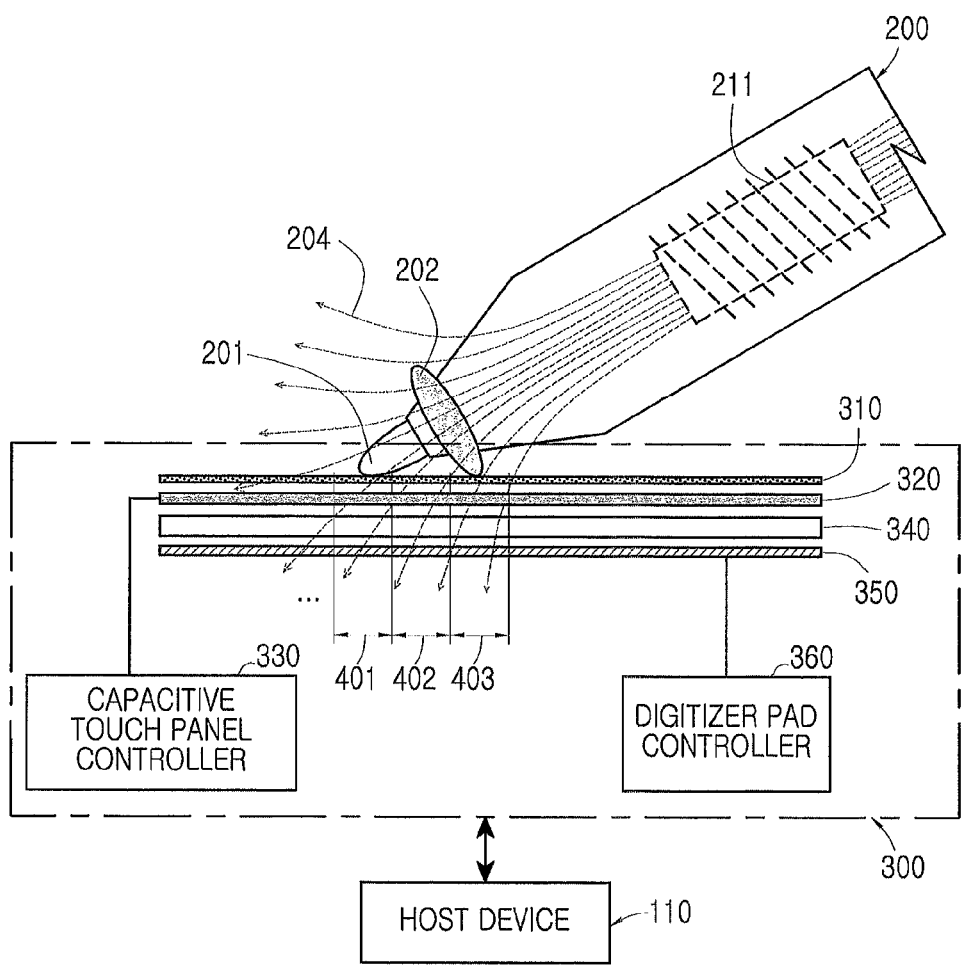
FIG. 6 illustrates configuration of an input system which uses a stylus pen according to one embodiment of the disclosure.

FIG. 6 illustrates configuration of an input system which uses a stylus pen according to one embodiment of the disclosure.

Referring to FIGS. 4 to 6, the input system using the stylus pen 200 uses an EMR scheme and includes the stylus pen 200 and the touch screen device 300.

The stylus pen 200 has a pen type shape which includes the tip 201 and the electrostatic rubber 202 which is installed proximate the rim of the tip 201. The stylus pen 200 includes the resonance circuit 210 therein.

The touch screen device 300 can include the digitizer 350, the display panel 340, the capacitive touch panel 320, the capacitive touch panel controller 330, the window 310, and the digitizer pad controller 360. The digitizer pad 350, the display panel 340, the capacitive touch panel 320, the capacitive touch panel controller 330, and the window 310 can be laminated in order.

The digitizer pad controller 360 supplies AC to the digitizer pad 350. The digitizer pad 350 generates an electromagnetic field. If the stylus pen 200 approaches the electromagnetic field of the digitizer pad 350, an electromagnetic induction phenomenon is generated and current is generated by the resonance circuit 210. Accordingly, a magnetic field 204 is formed by the generated current.

The digitizer pad controller 360 scans strength of the magnetic field 204 provided from the stylus pen 200 to the digitizer pad 350 throughout the entire region of the digitizer pad 350 and detects a position. The digitizer pad controller 360 provides the detected position to the host device 110. The host device 110 performs an operation for the detected position. For example, the host device 110 outputs image information on the display pad 340.

The stylus pen 200 has the resonance circuit 210 which is spaced apart from the tip 201. When the user holds the stylus pen 200 in his or her hand and then touches it on the touch screen device 300, it is slanted.

When the stylus pen is touched on the touch screen device 300 in a state where it is slanted, a position where a relatively great magnetic field from the stylus pen 20 is supplied leans toward the slanted side. In conclusion, when the stylus pen 200 is slanted, the digitizer pad controller 360 recognizes not a position 401 where the tip 201 is touched but a first position 402 which gets out of the position 401 where the tip 201 is touched.

Also, when the stylus pen 200 is slanted at a certain angle, the electrostatic rubber 202 is touched on the touch screen device 300. The capacitive touch panel controller 330 recognizes a second position 403 about a capacitance change from the capacitive touch panel 320.

The host device 110 receives the first position 402 from the digitizer pad controller 350 and receives the second position 403 from the capacitive touch panel controller 330. The host device 110 corrects the first position 402 with reference to the second position 403. For example, the host device 110 determines a direction of the second position 403 to the first position 402 and performs a correction for moving the first position 402 in an opposite direction of the determined direction. That is, the host device 110 includes a correction module for moving the first position 402 to be close to the touched position 401 of the tip 201. That is, when this correction module senses the second position 403 to the first position 402, it recognizes that the stylus pen 200 is slanted and corrects the first position 402 with reference to the second position 403.

Also, in some embodiments, the first position 403 is corrected only when the second position 404 is detected by the stylus pen 200. Accordingly, the host device 110 can determine a range corresponding to the first position 402. When the second position 403 is included in the determined range, the host device 110 includes the module for correcting the first position 402 with reference to the second position 403.

The host device 110 specifies the corrected first position as the position touched by the stylus pen 200.

Figure 7:
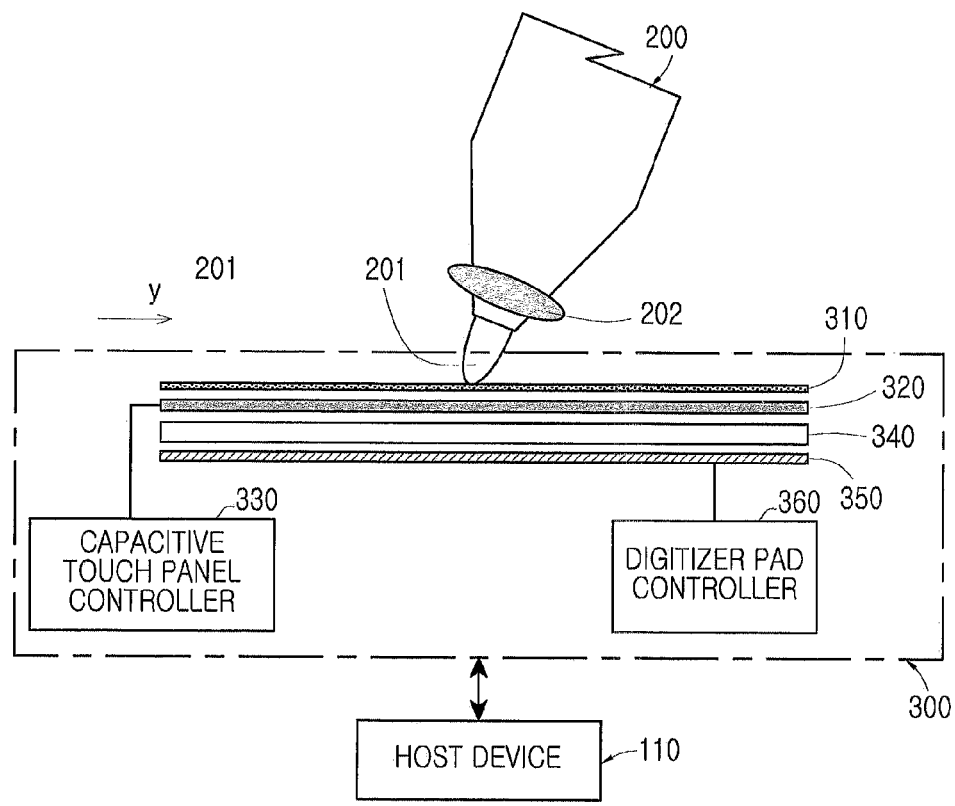
FIG. 7 illustrates configuration of an input system which uses a stylus pen according to one embodiment of the disclosure.
Figure 7:
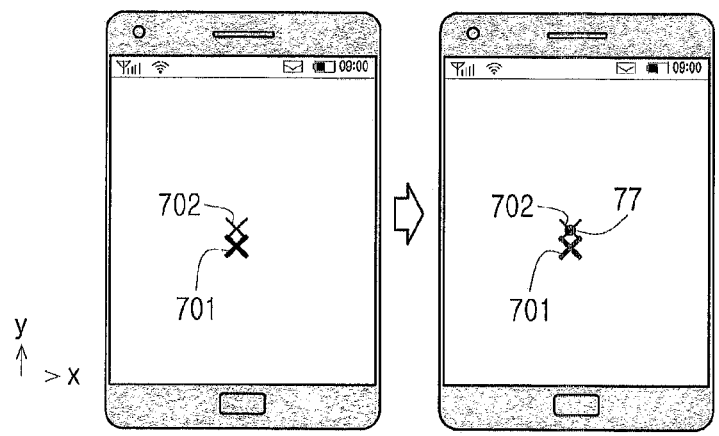

FIG. 7 illustrates configuration of an input system which uses a stylus pen according to one embodiment of the disclosure.

An electronic device determines a y-coordinate for a touch of the stylus pen 200.

Referring to FIGS. 6 and 7, only the tip 201 of the stylus pen 200 is touching the touch screen device 300.

The stylus pen 200 forms a magnetic field from current induced from an electromagnetic field of the digitizer pad 350. The digitizer pad controller 360 detects a y1-coordinate 702 on an magnetic field of the stylus pen 200 from the digitizer pad 350 and transmits the detected y1-coordinate 702 to the host device 110.

The host device 110 specifies the y1-coordinate 702 transmitted from the digitizer pad controller 360 as a y-coordinate 77 touched by the stylus pen 200.

Figure 8:
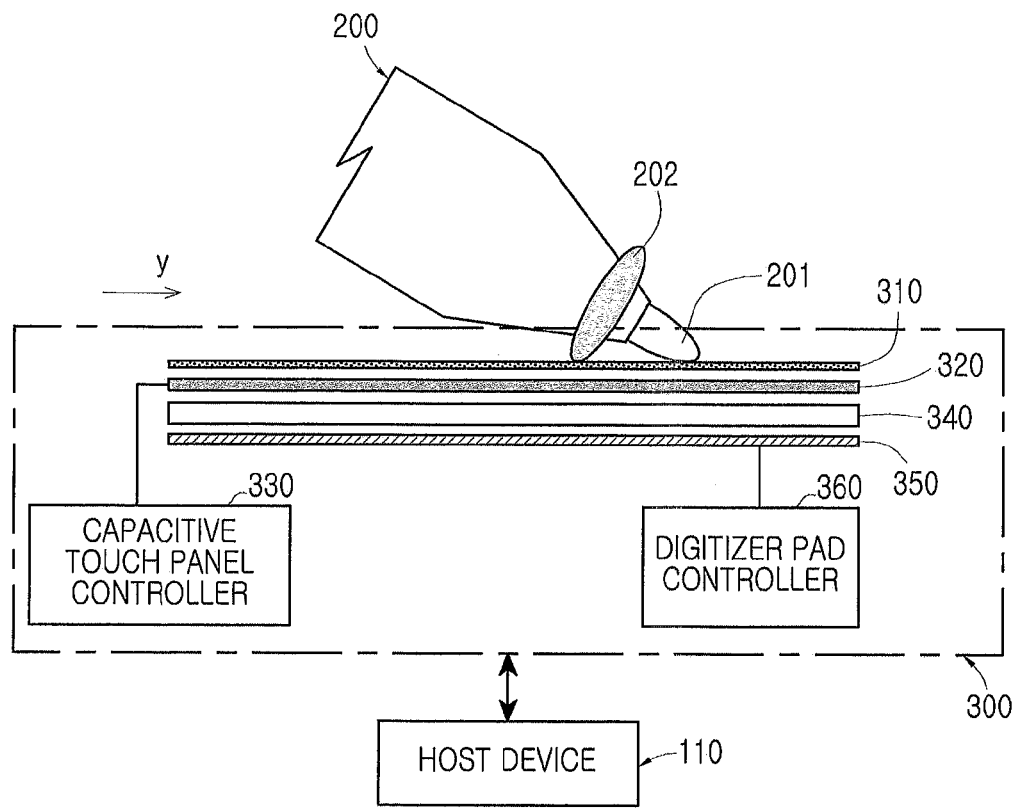
FIG. 8 illustrates configuration of an input system which uses a stylus pen according to one embodiment of the disclosure.
Figure 8:
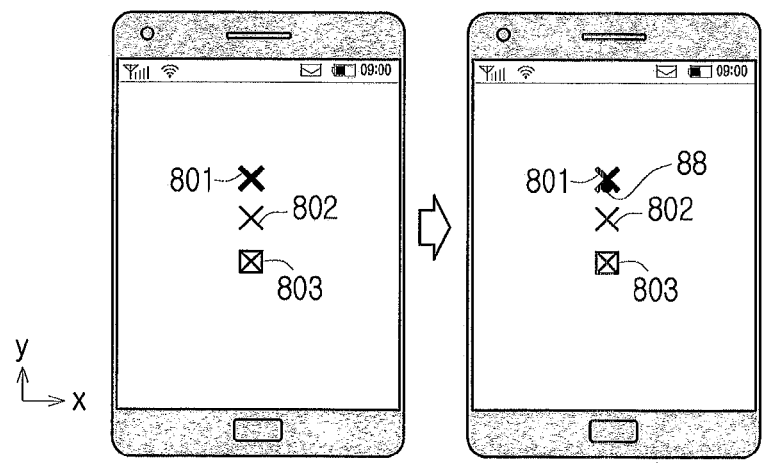

FIG. 8 illustrates configuration of an input system which uses a stylus pen according to one embodiment of the disclosure.

An electronic device determines a y-coordinate for a touch of the stylus pen 200.

Referring to FIGS. 6 and 8, when the stylus pen 200 touches the touch screen device 300 slanted at a certain angle, both the tip 201 and the electrostatic rubber 202 of the stylus pen 200 touch the touch screen device 300. For example, the user can hold the stylus pen 200 slanted with a grip shown in FIG. 3 and then touches it to the touch screen device 300.

The stylus pen 200 forms a magnetic field from current induced from an electromagnetic field of the digitizer pad 350. The digitizer pad controller 360 detects a y1-coordinate 802 on an magnetic field of the stylus pen 200 and transmits the detected y1-coordinate 802 to the host device 110.

Also, the touch pan controller 330 detects a y2-coordinate 803 about a capacitance change by the touch of the electrostatic rubber 202 of the stylus pen 200 from the capacitive touch panel 320 and transmits the detected y2-coordinate to the host device 110.

The host device 110 receives the y-coordinate 802 from the digitizer pad controller 360 and receives the y2-coordinate from the capacitive touch panel controller 330. The host device 110 corrects the y1-coordinate 802 with reference to the y2-coordinate 803 and specifies the corrected y1-coordinate 802 as a y-coordinate 88 touched by the stylus pen 200. For example, the host device 110 can determine a direction of the y2-coordinate 803 to the y1-coordinate 802 and perform a correction for moving the y1-coordinate 802 in an opposite direction of the determined direction. That is, the host device 110 includes a correction module for moving the y1-coordinate 802 to be close to the touched y-coordinate 801 of the tip 201.

Figure 9:
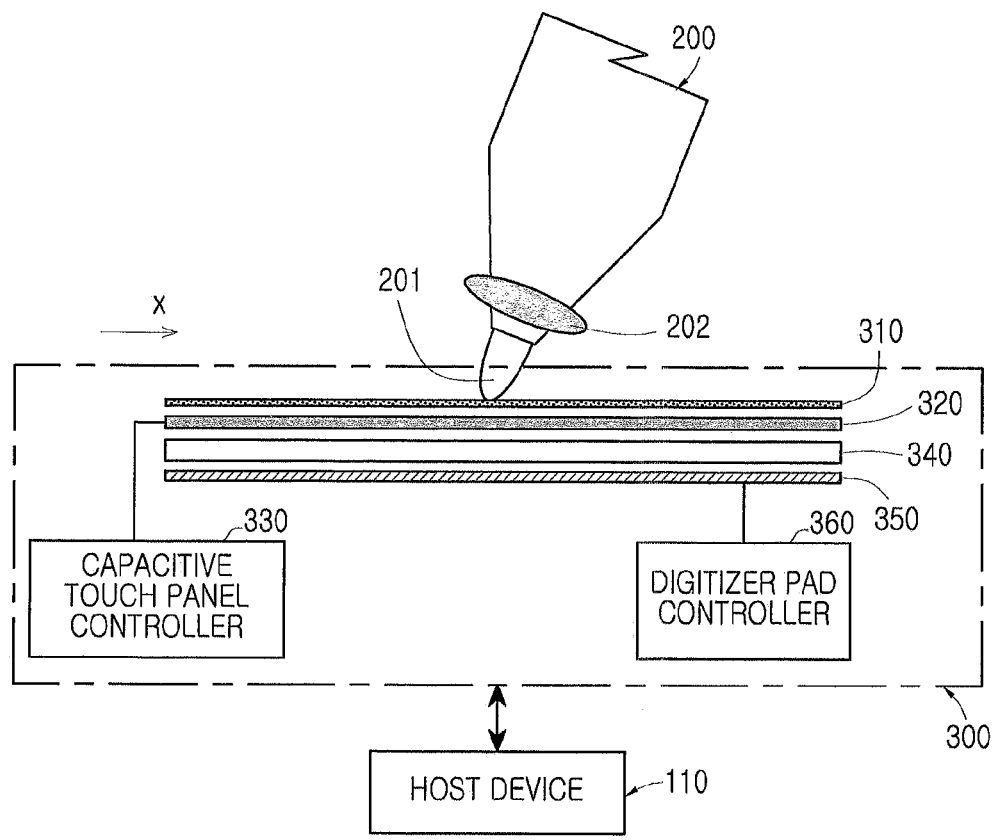
FIG. 9 illustrates configuration of an input system which uses a stylus pen according to one embodiment of the disclosure.
Figure 9:
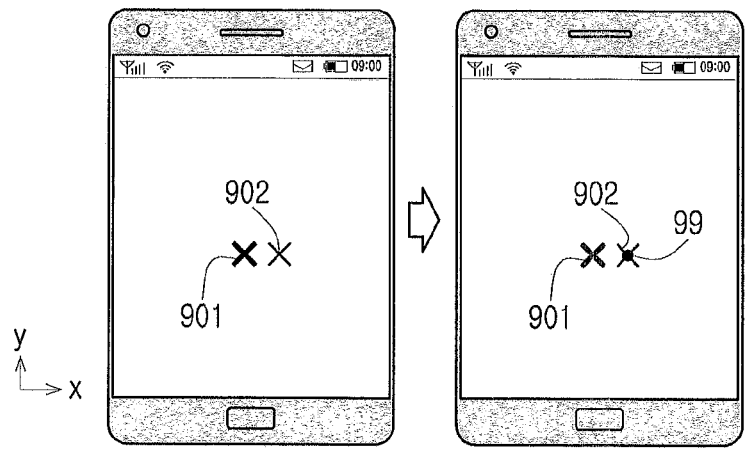

FIG. 9 illustrates configuration of an input system which uses a stylus pen according to one embodiment of the disclosure.

An electronic device determines an x-coordinate for a touch of the stylus pen 200.

Referring to FIGS. 6 and 9, only the tip 201 of the stylus pen 200 touches the touch screen device 300.

The stylus pen 200 forms a magnetic field from current induced from an electromagnetic field of the digitizer pad 350. The digitizer pad controller 360 detects an x1-coordinate 902 using a magnetic field of the stylus pen 200 from the digitizer pad 350 and transmits the detected x1-coordinate 902 to the host device 110.

The host device 110 specifies the x1-coordinate 902 transmitted from the digitizer pad controller 360 as an x-coordinate 99 touched by the stylus pen 200.

Figure 10:
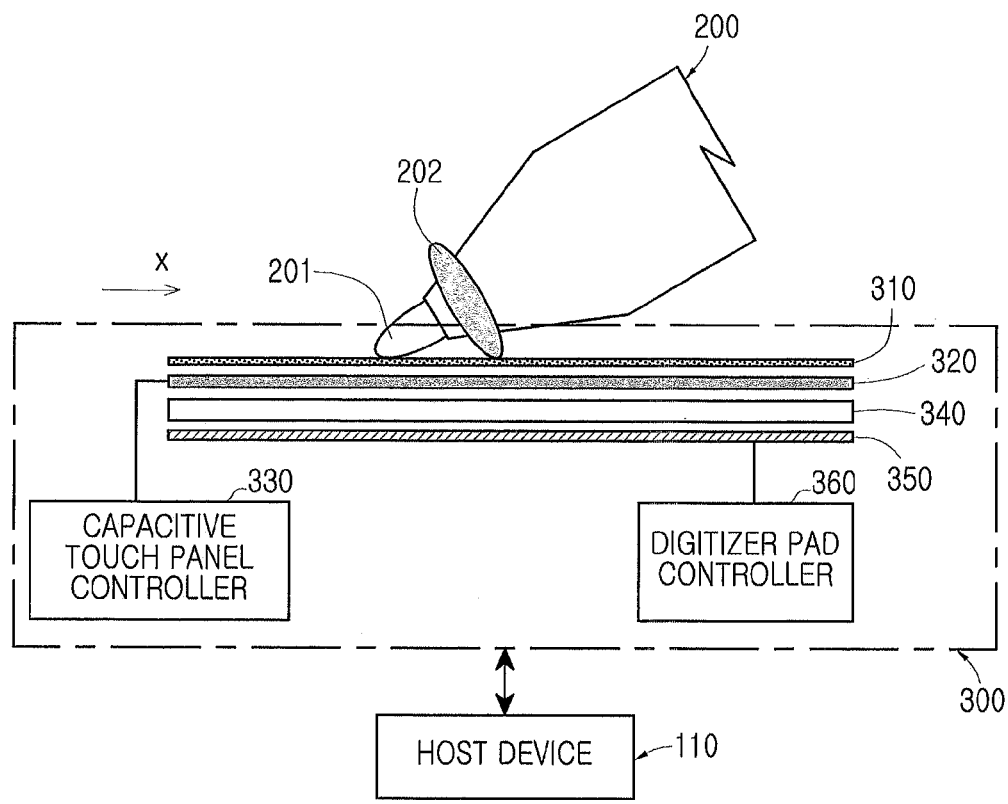
FIG. 10 illustrates configuration of an input system which uses a stylus pen according to one embodiment of the disclosure.
Figure 10:
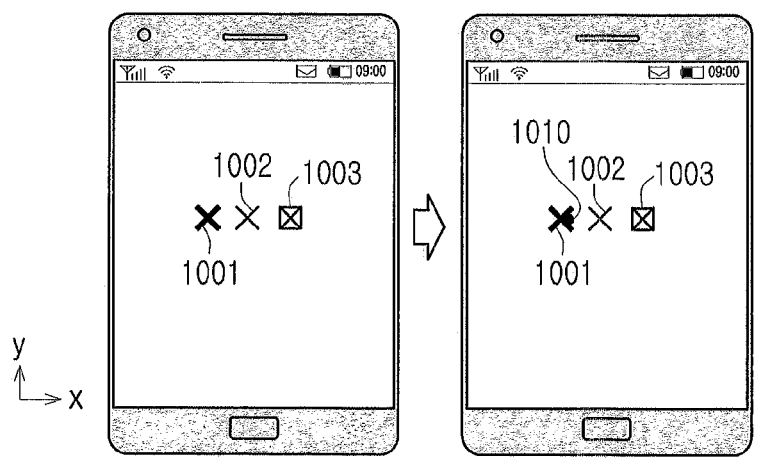

FIG. 10 illustrates configuration of an input system which uses a stylus pen according to one embodiment of the disclosure.

An electronic device determines an x-coordinate for a touch of the stylus pen 200.

Referring to FIGS. 6 and 10, when the stylus pen 200 touches the touch screen device 300 slanted at a certain, predetermined angle, or range of angles, both the tip 201 and the electrostatic rubber 202 of the stylus pen 200 touch the touch screen device 300. For example, the user can hold the stylus pen 200 slanted with a grip shown in FIG. 3 and then touches it to the touch screen device 300.

The stylus pen 200 forms a magnetic field from current induced from an electromagnetic field of the digitizer pad 350. The digitizer pad controller 360 detects an x1-coordinate 1002 on a magnetic field of the stylus pen 200 from the digitizer pad 350 and transmits the detected x1-coordinate 1002 to the host device 110.

Also, the touch pan controller 330 detects an x2-coordinate 1003 about a capacitance change by the touch of the electrostatic, rubber 202 of the stylus pen 200 from the capacitive touch panel 320 and transmits the detected x2-coordinate to the host device 110.

The host device 110 receives the x1-coordinate 1002 from the digitizer pad controller 360 and receives the x2-coordinate from the capacitive touch panel controller 330. The host device 110 corrects the x1-coordinate 1002 with reference to the x2-coordinate 1003 and specifies the corrected x1-coordinate 1002 as an x-coordinate touched by the stylus pen 200. For example, the host device 110 can determine a direction of the x2-coordinate 1003 to the x1-coordinate 1002 and perform a correction for moving the x1-coordinate 1002 in an opposite direction of the determined direction. That is, the host device 110 includes a correction module for moving the x1-coordinate 1002 to be close to the touched x-coordinate 1001 of the tip 201.

The embodiments of the disclosure shown in FIGS. 7 to 10 are described when the stylus pen 200 is slanted in upper and lower directions. However, the disclosure is not limited to them. A person skilled in the art would recognize that the disclosure is also applied to an embodiment when the stylus pen 200 is slanted in several directions, for example, a diagonal direction, etc.

Figure 11:
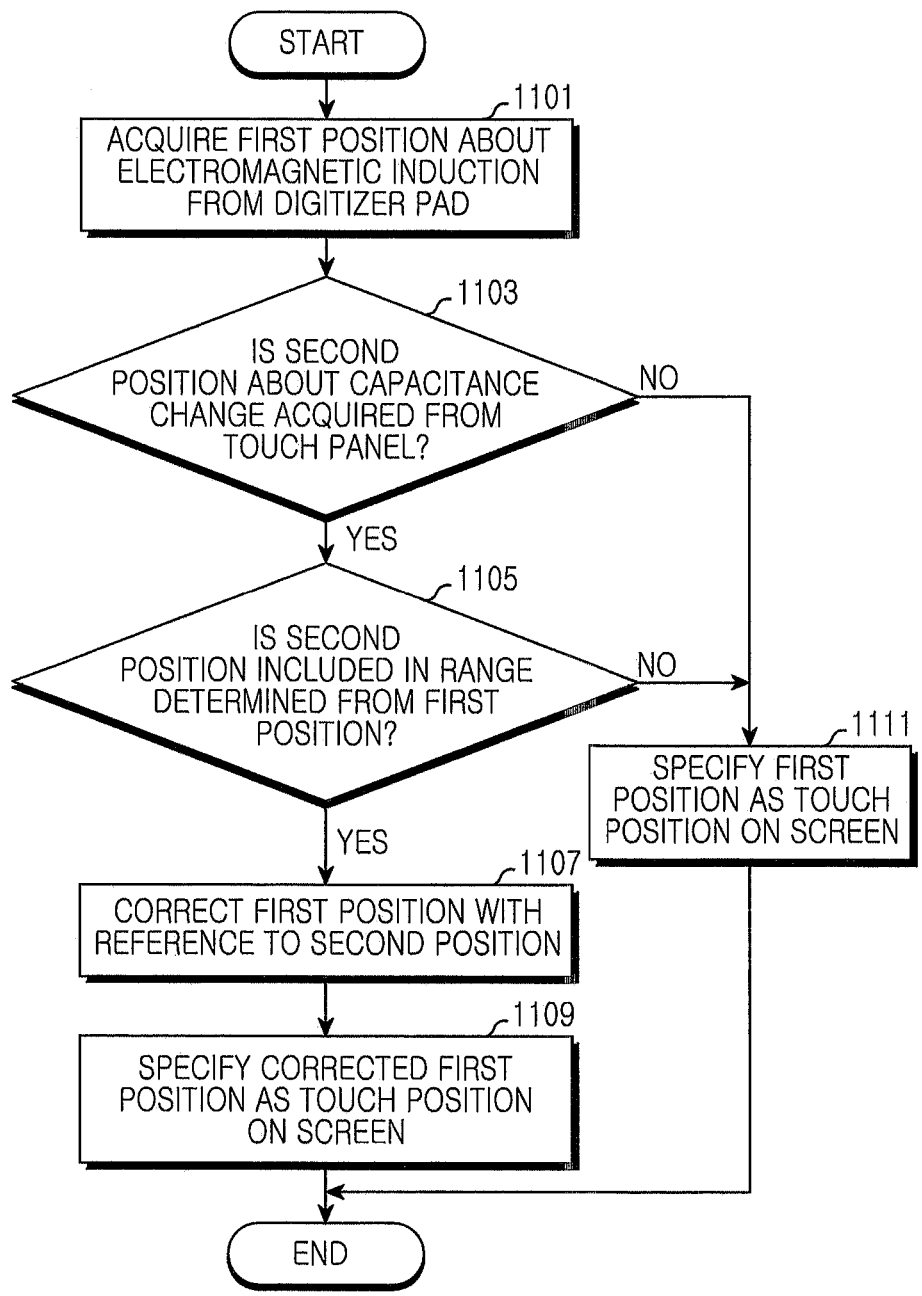
FIG. 11 illustrates an input processing procedure using a stylus pen in an electronic device according to one embodiment of the disclosure.

FIG. 11 illustrates an input processing procedure using a stylus pen in an electronic device according to one embodiment of the disclosure.

Referring to FIGS. 4 and 11, the processor 112 acquires a first position using electromagnetic induction from the digitizer pad 350 in step 1101.

The processor 112 identifies whether a second position using a capacitance change is acquired from the capacitive touch panel 320 in step 1103. When the second position is not acquired from the capacitive touch panel 320 in step 1103, the processor 112 proceeds to step 1111, specifies the first position as a touch position, and ends the algorithm of FIG. 11. On the other hand, when the second position is acquired from the capacitive touch panel 320 in step 1103, the processor 112 proceeds to step 1105.

The processor 112 determines a certain range from the first position and identifies whether the second position is included in the determined range in step 1105. The process of step 1105 is a process of verifying whether the second position by the stylus pen 200 is detected. The processor 112 can determine a certain radius range from the first position. In step 1105, when the second position is not included in the range determined from the first position, the processor 112 proceeds to step 1111. On the other hand, when the second position is included in the range determined from the first position, the processor 112 proceeds to step 1107.

The processor 112 corrects the first position with reference to the second position in step 1107.

The processor 112 specifies the corrected first position as a touch position in step 1109.

Referring to FIG. 11, the processor 112 determines a range from the first position and corrects the first position with reference to the second position when the second position is included in the determined range. The processor 112 can correct, but is not limited to, the first position with reference to the second position when the first position and the second position are simultaneously corrected or all of them are detected within a threshold time.

Figure 12:
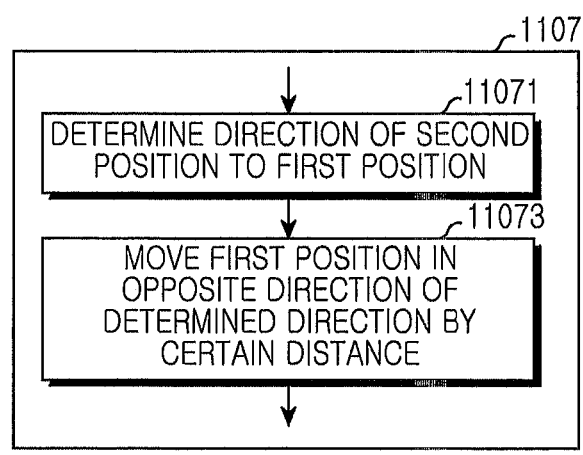
FIG. 12 illustrates a process of correcting a first position with reference to a second position in step 1107 of FIG. 11.

FIG. 12 illustrates a process of correcting a first position with reference to a second position in step 1107 of FIG. 11.

Referring to FIGS. 4, 11, and 12, the processor 112 determines a direction of the second position to the first position in step 11071.

The processor 112 performs a correction for moving the first position in an opposite direction of the determined direction by a certain distance in step 11073.

The stylus pen according to embodiments of the disclosure can cause touch recognition through the digitizer pad by including the resonance circuit and cause touch recognition through the capacitive touch panel by installing the electrostatic rubber on the rim of the tip. Therefore, the stylus pen can improve accuracy.

Also, the electronic device detects the first position recognized through the digitizer pad together with the second position recognized through the capacitive touch panel using the this stylus pen, determines whether the stylus pen is slanted through the second position, corrects the first position, and specifies the corrected first position as a touch recognition position. Therefore, when the stylus pen is slanted, because the touch recognition position is aligned with the tip, the electronic device provides appropriate feedback to the user. The above-described methods according to the present invention can be implemented in hardware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While certain exemplary embodiments have been particularly shown and described, it will be understood by those skilled in the art that various changes in form and details may be made therein without departing from the spirit and scope of the disclosure as defined by the appended claims.

What is claimed is:

1. An input method in an electronic device, the method comprising:
    detecting a first position using electromagnetic induction from a digitizer pad of the electronic device;
    detecting a second position using a capacitance change from a capacitive touch panel of the electronic device;
    determining a range corresponding to the first position as a radius range from the first position;
    correcting the first position with reference to the second position when the second position is included in the range corresponding to the first position; and
    determining the corrected first position as a touch position.

2. The input method of claim 1, wherein the correction of the first position with reference to the second position is performed when the first position and the second position are simultaneously detected or the first position and the second position are detected within a threshold time.

3. The input method of claim 1, wherein the correction of the first position with reference to the second position comprises determining a direction of the second position to the first position and moving the first position in an opposite direction of the determined direction.

4. The input method of claim 1, further comprising displaying the corrected first position on the capacitive touch panel.

5. An electronic device comprising:
    a digitizer pad;
    a capacitive touch panel which is disposed above the digitizer pad;
    a digitizer pad controller configured to detect a first position using electromagnetic induction from the digitizer pad;
    a touch panel controller configured to detect a second position using a capacitance change from the capacitive touch panel;
    one or more processors;
    a memory; and
    one or more modules, each of the one or more modules stored in the memory and configured to be executed by each of the one or more processors,
    wherein each of the one or more modules is configured to determine a range corresponding to the first position as a radius range from the first position, and
    wherein each of the one or more modules is configured to correct the first position with reference to the second position when the second position is included in the range corresponding to the first position and specifies the corrected first position as a touch position.

6. An electronic device comprising:
    a digitizer pad;
    a capacitive touch panel which is disposed above the digitizer pad;
    a digitizer pad controller configured to detect a first position using electromagnetic induction from the digitizer pad;
    a touch panel controller configured to detect a second position using a capacitance change from the capacitive touch panel; and
    a host device configured to determine a range corresponding to the first position as a radius range from the first position, and to correct the first position with reference to the second position when the second position is included in the range corresponding to the first position and specify the corrected first position as a touch position.

7. The electronic device of claim 6, wherein the host device corrects the first position with reference to the second position when the first position and the second position are simultaneously detected or the first position and the second position are detected within a threshold time.

8. The electronic device of claim 6, wherein the host device determines a direction of the second position to the first position and moves the first position in an opposite direction of the determined direction when correcting the first position with reference to the second position.

9. The electronic device of claim 6, wherein the touch panel controller is further configured to display the corrected first position on the capacitive touch panel.

10. The electronic device of claim 5, wherein each of the one or more modules corrects the first position with reference to the second position when the first position and the second position are simultaneously detected or the first position and the second position are detected within a threshold time.

11. The electronic device of claim 5, wherein each of the one or more modules determines a direction of the second position to the first position and moves the first position in an opposite direction of the determined direction when correcting the first position with reference to the second position.

12. The electronic device of claim 5, wherein the touch panel controller is further configured to display the corrected first position on the capacitive touch panel.

* * * * *